126, STOVES & FURNACES,

377

Examiner

BEST AVAILABLE COPY

Nov. 14, 1933. C. FIELD Re. 18,993

METHOD OF HEAT TRANSFER AT HIGH TEMPERATURE of Orig. 1,810,912

Original Filed April 17, 1922 3 Sheets-Sheet 1

INVENTOR
Crosby Field
BY
G. Angle Pease
ATTORNEY

126. STOVES & FURNACES,
377
Examiner
Nov. 14, 1933. C. FIELD Re. 18,993
METHOD OF HEAT TRANSFER AT HIGH TEMPERATURE
Original Filed April 17, 1922 3 Sheets-Sheet 2
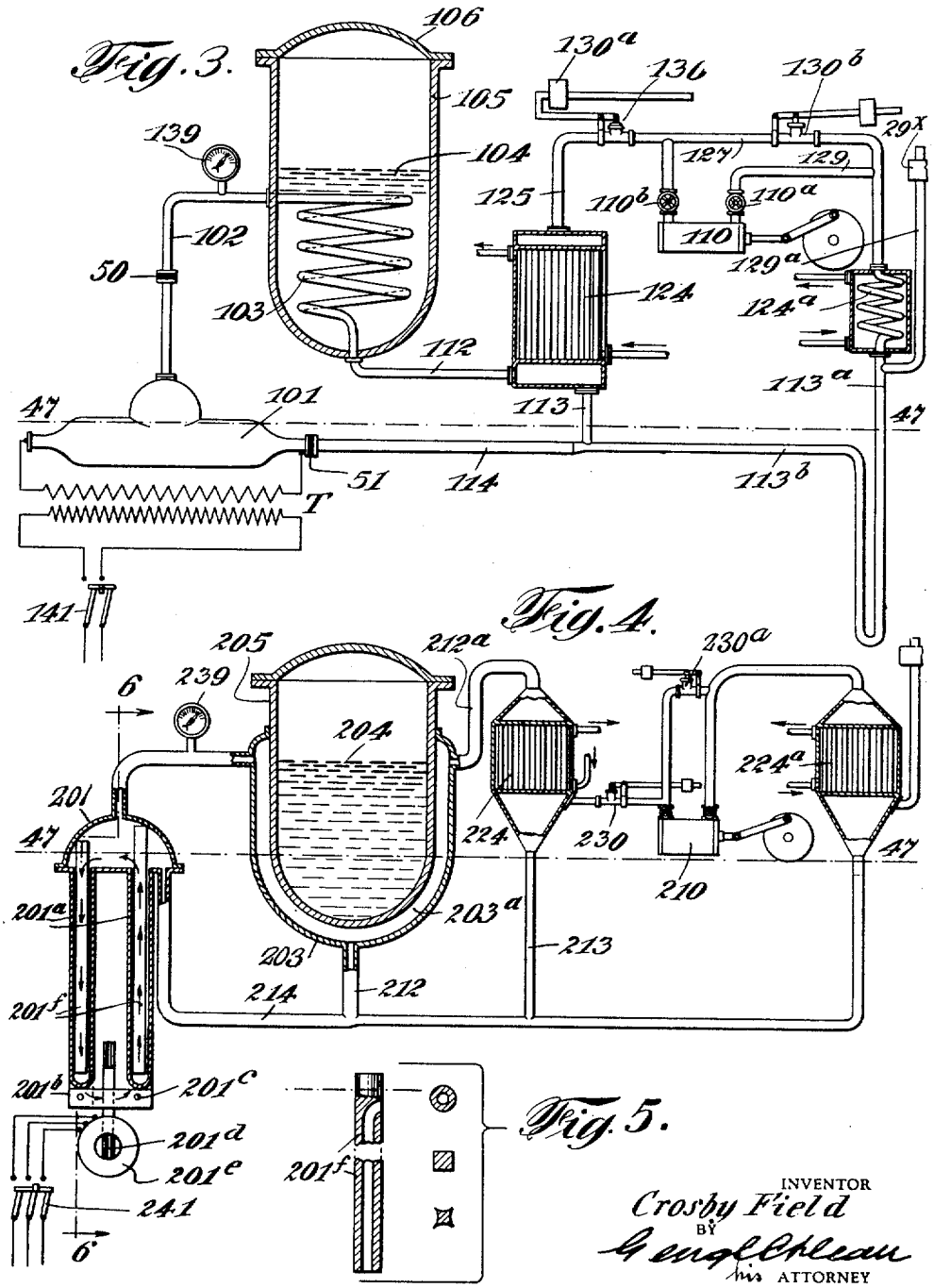
INVENTOR
Crosby Field
BY
George Otleau
his ATTORNEY 126. STOVES & FURNACES,
377
Examiner
Nov. 14, 1933. C. FIELD Re. 18,993
METHOD OF HEAT TRANSFER AT HIGH TEMPERATURE
Original Filed April 17, 1922 3 Sheets-Sheet 3
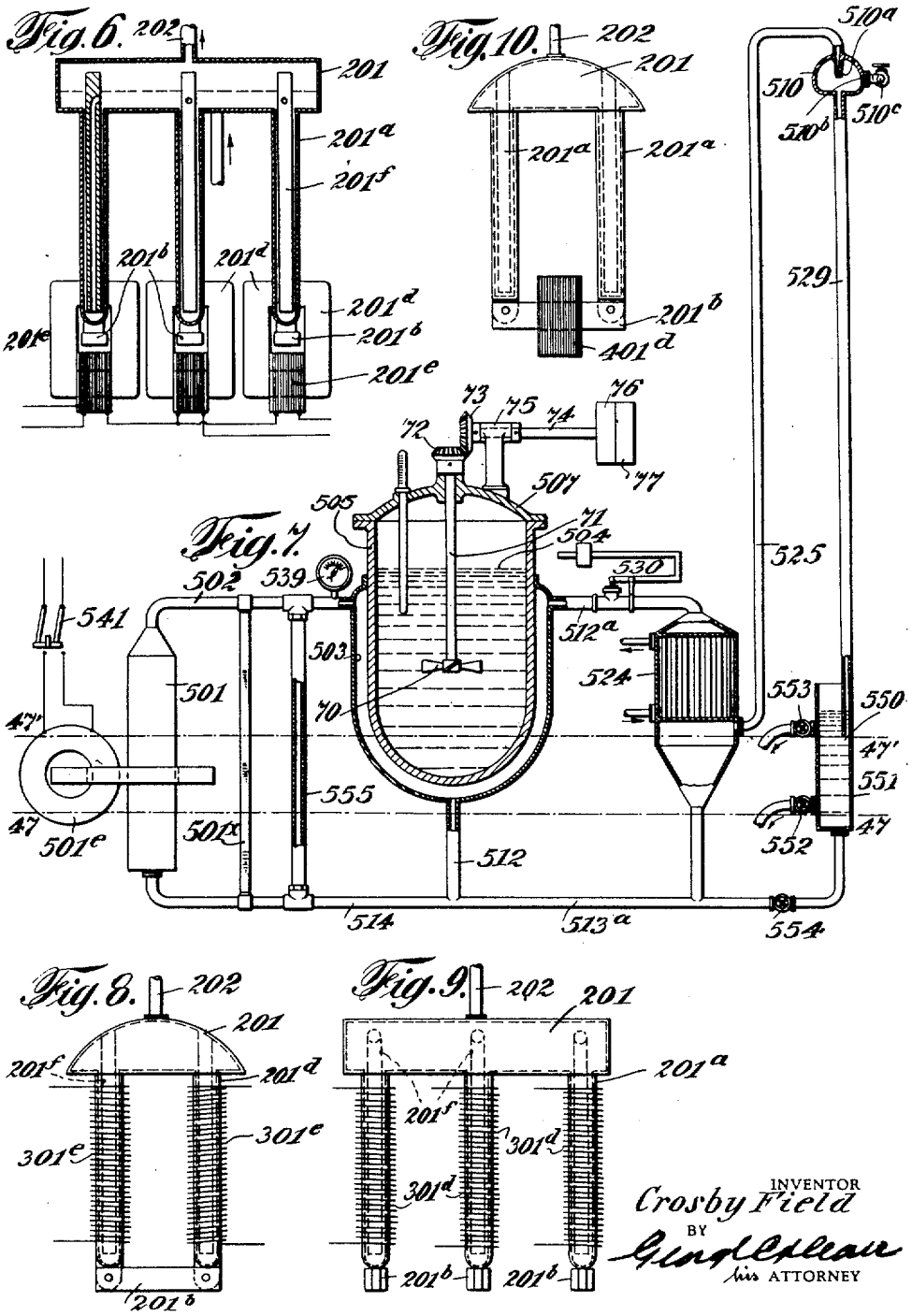

126. STOVES & FURNACES,
377

Examiner

Reissued Nov. 14, 1933

Re. 18,993

UNITED STATES PATENT OFFICE 18,993

METHOD OF HEAT TRANSFER AT HIGH TEMPERATURE

Crosby Field, Brooklyn, N. Y., assignor to Chemical Machinery Corporation, a corporation of New York Original application April 17, 1922, Serial No. 553,640. Divided and application February 5, 1927, Serial No. 166,072, Patent No. 1,810,912, dated June 23, 1931. Application for reissue June 14, 1933. Serial No. 675,819

5 Claims. (Cl. 126—370)

My present invention is more or less closely related to certain heat transferring operations of the class described in my Patent No. 1,403,471, granted January 10, 1922. In the present case, as in my Patent No. 1,619,661 granted March 1, 1927, on application Ser. No. 553,640, filed April 17, 1922, of which this is a division, the heat transferring medium is a liquid of boiling point much above that of water, preferably mercury; the temperatures at which heat is to be transferred are usually far above said boiling point of water; the temperatures of heat transfer either to the transferring medium or from the transferring medium, or both, are determined by the internal pressures at the boiling or the condensing points, or both; and these pressures may be controlled either by hand manipulation or automatic action of valves, pumps or other suitable pressure controlling devices.

My present invention includes regulating the temperature in the heat transferring system by controlling the internal pressure by and in accordance with the temperature of a region or substance to be heated or cooled; or by the difference between the internal and external pressures; and the external pressure may be atmosphere or may be one maintained in an auxiliary part of the system by a vacuumizing or other pressure controlling pump.

In the preferred embodiment and in normal operation the pressure is approximately uniform throughout the circuit of the heat transfer medium, although the pressure at the boiling or heat absorption point may be higher than at the condensing or heat yielding point.

While the system may be employed partly or exclusively for cooling the primary purpose illustrated is heating substances, for distillation, sublimation or chemical reaction which require limiting the temperatures for a predetermined maximum or minimum, or between a maximum and a minimum; or for different temperatures successively.

My present invention includes systems wherein there is a supplemental condenser located beyond the primary condensing region and adapted to return its condensate to the circulating system. In certain cases the supplemental condenser is beyond the pressure controlling valve; in others it is between the primary condensation or heat yielding region and the pressure controlling valve; in others between the pressure controlling valve and the pump; and in others there is the supplemental condenser in advance of the pressure controlling devices, in combination with an exhaust condenser path located beyond the pressure controlling devices. In some cases this exhaust condenser has a continuously open return path to the circulating system and in others the return is controlled by a valve opened only when conditions of operation permit.

Preferably all of the systems have pumps adapted to withdraw foreign gases and impurities from the circulation and these are preferably arranged to discharge the impurities into the atmosphere without interfering with return of condensate to the circulation and without interfering with the desired vacuum or pressure conditions within said circulating system.

In certain cases the desired operation is continuously endothermic or heat absorbing. In such case the heating is by the condensation portion of the cycle and the control of temperature is accomplished entirely by control of the pressure of the vapor being condensed.

An important feature of my invention, however, concerns a system which will automatically control the temperature of a desired region when the operation in said region requires heating at one time and cooling at another time under conditions where the operation of the fluid medium must shift from a primary condition of condensing to impart heat, over to a secondary condition of boiling to absorb heat; and to do this automactically. This very difficult special case is frequently met with in the chemical industry. Certain chemicals in the mixture must be heated to a predetermined critical temperature. In certain cases, notably oxidation or partial oxidation of organic compounds, heating to a certain critical temperature will initiate an exothermic or heat evolving reaction. The heat thus evolved necessarily raises the temperature further and the higher temperature thus produced may cause a decomposition of the product or even an explosion and in most cases it will create a condition unsuitable for the best performance of the desired reaction. Hence one part of my invention concerns mainting a body of liquid medium in heat absorbing relation to the same region which is initially heated by condensation of the heated vapor. Where the heat transferring wall is thin sheet steel and the temperature drop between exterior and interior is small, the two operations will come into effect successively and automatically upon change of a few degrees in the temperature of a chemical mixture, even without change of the internal pressures. Moreover, where there is automatic, thermostatic control of pressures by and in accordance with the heat of the chemicals, as above mentioned, the regulation may be even closer.

Another feature of my invention concerns various methods of electrically heating and boiling the mercury to be circulated to the region of condensation for imparting heat therein.

The above and other features of my invention will be more evident from the following description in connection with the accompanying drawings, in which—

Figs. 1, 3, 4 and 7 are diagrammatic views of systems embodying various features of my invention.

Fig. 5 shows in longitudinal and cross section modifications of the iron filler pieces shown in Figs. 4 and 6.

Fig. 6 is a vertical section on the line 6—6, Fig. 4.

Figs. 8 and 9 are respectively end and side elevations of one form of electrically heated boiler.

Fig. 10 is an end elevation of another form of electrically heated boiler.

In these drawings the boiler, pipes, valves, condensers, and all other parts likely to contact with mercury are preferably of iron or steel, since such materials are ordinarily not attacked or even wetted by mercury. The various containers and pipes for performance of the heating function are understood to be properly heat insulated.

Figure 1:
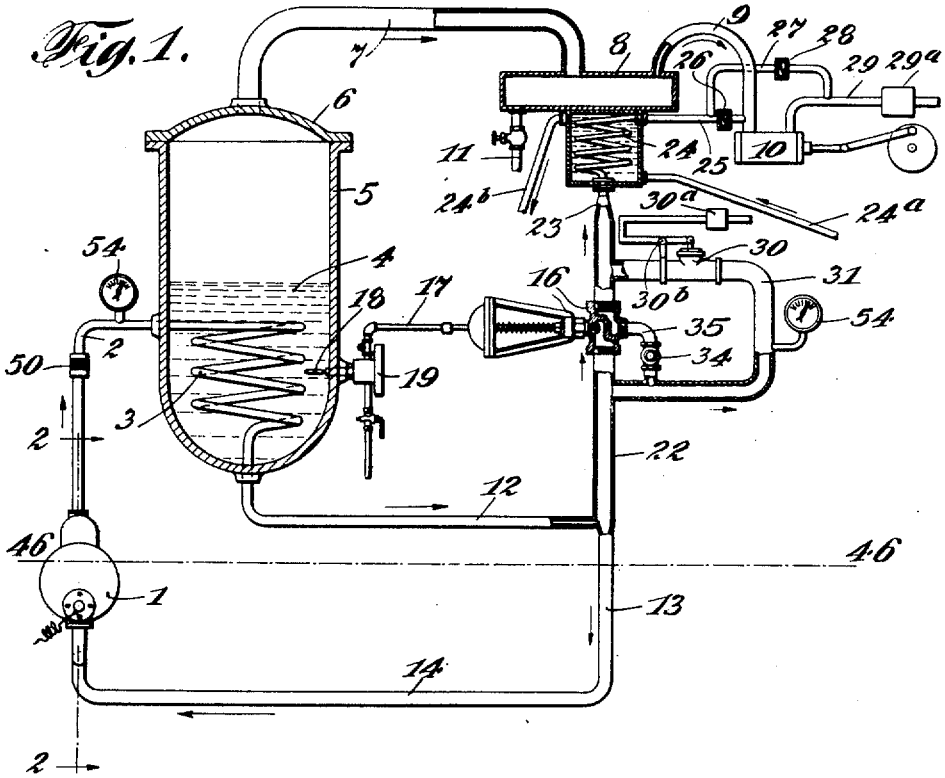

Fig. 1 shows a system particularly adapted for certain cases of heating operations where the operation is one of imparting heat and the substance or region to be heated does not generate heat in excess of its own radiation losses. That is to say, the system is one for continuous or intermittent heat application.

The system comprises a heat absorbing and mercury boiling element which in this case is a boiler 1, connecting through pipe 2 with a condensing or heat-imparting coil 3, in contact with a cooling medium 4 in a suitable container 5. In this case the cooling medium is usually a compound or mixture of compounds to be heated for the purpose of causing distillation or sublimation or chemical reaction or all three, either simultaneously or successively. The container 5 may be of any desired metal suitable for its purpose since the mercury does not come in contact with it. As shown it is hermetically closed by a top 6 communicating through a pipe 7 with a cooling chamber 8, the whole being vacuumized through pipe 9 by a pump diagrammatically indicated at 10. Distillate or sublimate caught in chamber 8 may be removed through a suitable outlet, as for instance, the valve controlled pipe diagrammatically indicated at 11. These parts may be the ordinary vacuum distilling or sublimating unit, such as commonly employed in the manufacture of petroleum and coal tar products; and the usual mechanical stirring means (not shown) may be employed if desired.

While the mercury boiling element 1 may be usefully employed as a cooling element for any desired heat evolving system, it is shown in this case as being electrically heated from any desired source of power.

As will be evident from the drawings, the coil 3 is a down-flow condenser and it discharges through pipe 12 from which the condensed mercury has a return flow path through pipes 13, 14 and branch pipes 15, 15, to the ends of boiler 1. Any uncondensed vapor can pass up through pipe 22 whence its further progress will be determined by the pressure control instrumentalities.

The internal pressure is controlled by controlling the escape of such vapor. In the present case there are two controls either of which may be employed separately but which are especially advantageous when employed in combination.

The vapor from 12 is discharged into pipe 22, from which in normal operation of the device it will be permitted to flow through certain controlling devices into pipe 23, up-flow condenser coil 24, vacuumized through pipe 25, check valve 26, pump 10 and discharge outlet 29. The jacket of condenser 24 is supplied with cooling water through pipe 24*a*, which water escapes through the pipe 24*b*. A trap 29*a* may be interposed in pipe 29 containing material adapted to combine with the last traces of mercury vapor, thus preventing any mercury from escaping to the outer air.

The suction pump 10 is utilized to maintain in the condenser 24 and pipe 23 a pressure which is usually less than atmospheric and which in any event is preferably less than the pressure in pipe 22, which latter is preferably that of the circulating system.

One of the controls for the pressure is valve 16, operated by fluid pressure through pipe 17, controlled by the thermometric or heat sensitive element 18, the operation of which is controlled by adjustable mechanism diagrammatically indicated at 19.

Another control is by means of pressure relief valve 30 arranged in a parallel pipe connection 31. There is also a down-flow check valve 34 in a third parallel pipe 35 through which condensed mercury may flow back into the system.

As shown in the drawings, the pressure relief valve 30 may be set for above-atmosphere pressures in the system as by having the weight 30*a* to the right of fulcrum 30*b* as shown in Fig. 1; or for below-atmosphere pressures as when the weight is to the left of said fulcrum. When the predetermined pressure is exceeded the valve automatically opens and vents the vapor into pipe 23 and condenser 24. For below-atmosphere pressures the pump will be operated in the usual way. For above-atmosphere pressures escape may be through pipe 27, check valve 28 and outlet 29. A check valve may be provided at 26 to prevent accidental back flow of gaseous products from the still into the mercury condenser 24.

As before mentioned, valves 16 and 30 are adapted for operation as follows:

Container 5 being supplied with the desired amount of substance 4 to be heated, pump 10 is started vacuumizing the heating system through pipe 25, condenser 24, pipe 23, and one of the valves 16 or 30, which may be held open for the purpose. The resistance 40 being properly adjusted, switch 41 is closed, current flows through mercury in the container 1 and also through the walls of the container heating and eventually boiling the same. The hot vapor flows through pipe 2 and condenser coil 3. Material 4 being cold, practically all of the mercury will be condensed; also the heat sensitive element 18 will be cold, so the valve 16 will be closed.

Valve 16 will remain closed until the substance 4 is heated up to the desired critical temperature for which the device 18 is adjusted and pressure relief valve 30 will stay closed until the internal pressure exceeds that for which said valve is set. Normally the boiling, condensing and heating may proceed until the internal pressure exceeds that for which valve 30 is set and thereafter venting through 30 will control until the mixture 4 reaches the critical temperature for which the thermostat 18 is set.

Preferably the thermostat 18 will be set to control at lower pressures than the pressure relief valve 30. Hence when the material 4 is once heated enough to bring the valve 16 into action, it will control exclusively unless or until vapor is generated in excess of the capacity of said valve 16, in which case the pressure relief valve will act as an ordinary safety valve blowing off at the predetermined higher pressure for which it is set.

Preferably the valve 16 is used for close regulation of below-atmosphere pressures, pipe 23 being vacuumized so that the pressures therein will always be less than that in the circulating system. Usually valve 30 will be set for control where internal pressures above atmosphere are desired and in such case valve 16 may be permanently closed.

The liquid condensate can return through said valve 16 whenever it is open, but whenever valve 16 is closed, and valve 30 is controlling, the return of condensate will be through check valve 34 and will occur whenever weight of the condensate becomes sufficient to open said valve against the internal pressure. Other settings of one or both valves for either separate or joint control, either below or above atmospheric pressure, will be selected to suit special conditions or purposes. The pressures may be predetermined by calibration of 19 and 30, but pressure gauges may also be employed as at 54 in pipe 2 or in pipe 31.

The container in which mercury is boiled to absorb heat is long as compared with its cross section and is formed with a central vapor collecting dome 40 and also with reduced ends 44, 44. The heating current is supplied through electrodes 42, 42, mounted in insulated blocks 43, 43, in said reduced ends 44. The reduced ends afford the smallest cross section and greatest heat development tends to localize therein; also the return of condensate through branch pipes 15, 15, is to these regions of greater heat development. The mass of mercury in boiler 1 affords a path for electric current which is of so much lower resistance than any other path that the leakage losses in other directions are minimized but insulation may be employed for parts above the level of the liquid mercury, as diagrammatically indicated at 50.

Figure 2:
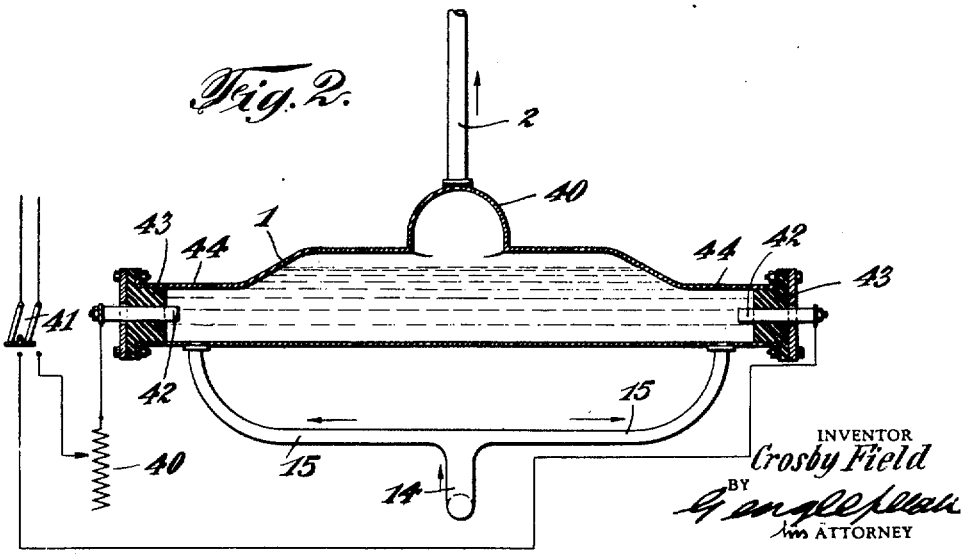
Fig. 2 is a sectional detail on the line 2—2, Fig. 1.

In the apparatus of Figs. 1 and 2, the level of the mercury is preferably at or near that indicated by dotted line 46, 46. This level is high up in the boiler, is well above the level of return pipe 13, 14, and is well below the level of return pipe 12. Thus the flow of vapor and condensate through pipe 12 is free and unthrottled by any static back pressure of mercury, while the body of mercury in pipes 13, 14, maintains a liquid seal against back flow of mercury vapor through said pipes.

The system shown in Fig. 3 resembles that of Fig. 1 in many respects but has important differences. Analogous elements include region 101 in which the fluid medium absorbs heat and boils, the pipe 102 for up-flow of the vapor, the gauge 139 indicating internal pressure, the worm coil 103 wherein the vapor condenses for imparting heat to the material 104, the container 105 for the latter, the pipe 112 for outlet of condensate and uncondensed vapor, the down flow pipe 113 and the return pipe 114 for return flow of the condensate to the boiler element 101, all being substantially as above described.

In the present case the boiler 101 is heated by a current from the secondary of transformer T, the primary of the transformer being supplied with alternating current through suitable controlling devices including the switch 141. The transformer is particularly useful because of convenience in stepping down the voltage to get correspondingly great amperage for heating effect on the boiler 101.

The pipe 112 leads to and the pipe 113 drains out of the bottom of a tubular up-flow condenser 124, which in this case is between the primary or heating condenser 103, and the pressure regulating devices. The upper part of the condenser has an outlet through pipe 125 which may be vacuumized by pump 110. In place of the thermostatically controlled valve 16 of Fig. 1, there is a pressure relief valve 130 adjustable for venting at the desired internal pressures, indicated by position of weight 130*a* as being less than atmosphere. This valve may be set for internal pressures greater than atmosphere by shifting the weight to the other side of the fulcrum. When internal pressures above atmosphere are required, the pump may be cut off by valves 110*a*, 110*b*. Then the outlet will be through parallel pipe 127 which provides a by-pass from the intake 125 to the discharge 129 of pump 110. This by-pass 127 may be controlled by a pressure relief valve 130*b* adapted to be set for venting internal pressures above atmosphere. These valves 130 and 130*b* are adapted for simultaneous or successive operation somewhat as valves 16 and 30 of Fig. 1, except that the primary valve is controlled by internal pressure instead of thermostatically.

The uncondensed gases passing either through pump 110 or the by-pass 127 flow to the residual condenser 124*a*. The lower end of this condenser connects through a barometric U-leg 113*a*, and pipe 113*b* with the return pipe 114 which leads back to the boiler 101. The level of the mercury is indicated by the dotted line 47, 47, as being near the top of boiler 101; below the drainage pipe 112 and condensers 124, 124*a*; but above the barometric U pipe 113*a*, and the return flow pipes 113*b* and 114.

There is a pipe 129*a* affording an atmospheric outlet from pipe 113*a*, below the residual condenser 124*a*, but above the level of the mercury. Outlet pipe 129*a* may have interposed therein a trap 29*x* like the trap 29*a* in Fig. 1.

It will be understood that the closed circuit through the residual condenser 124*a* and the barometric U, 113*a*, may be used in conjunction with the system shown in Fig. 1, as may also the pipe 129*a* through which uncondensed gases may be discharged to the atmosphere.

In the system shown in Fig. 4, the vacuumizing pump 210, the supplemental condenser 224, residual condenser 224*a*, the primary pressure relief valve 230, secondary relief valve 230*a*, container 205 for the material 204 which is to be heated, as also the adjustments to be made and the operations to be performed, may be substantially the same as in Fig. 3. It is noted, however, that the supplemental condenser 224 is a down-flow condenser and residual condenser 224*a* is a tubular condenser instead of a worm.

The important differences are that the primary or heat imparting condenser 203 is in an external jacket 203*a* instead of the internal worm 103 and that instead of a single outlet 112 for both condensate and uncondensed vapor, there are two separate outlets, one a pipe 212 from a low point of the jacket for return of the condensate and the other a pipe 212*a* from a high point in the jacket for escape of the uncondensed vapor.

This arrangement whereby the pressure of the liquid mercury in the jacket does not interfere with the circulation of the condensing vapor facilitates employment of an important feature not found in Fig. 3; namely, an arrangement whereby the normal level of the mercury, indicated by line 47—47, is substantially above the bottom of the container 205, so that the lower portion of said container is continuously bathed in a body of liquid mercury. In normal operation, this mercury will be hot condensate which may be at or near the temperature of condensation as determined by the particular internal pressure then being maintained by the pressure regulating valves. This body of condensate in the jacket is in an important strategic position in several particulars.

In case of ordinary work requiring only endothermic or heat absorbing operations on the material 204, the condensed mercury is free to flow downward through 212 and back to the boiler 201 as in Figs. 1 and 3.

But in cases where the reaction in material 204 becomes exothermic or heat generating, this mercury automatically begins to function as a cooling medium. It absorbs heat from the container 205 and begins to boil as soon as the temperature of the mixture 204 rises slightly above the critical condensing temperature as determined by the pressure controlling devices. The boiled off liquid is replenished through pipe 212 after the same manner as the primary boiler 201. The vapor resulting from the boiling has a free path of escape through the regular vapor outlet 212*a* to condenser 224 and its pressure, condensation and return flow to the jacket or secondary boiler may be automatically controlled by the instrumentalities above described for the primary boiler. Obviously, however, the adjustment of the pressure relief valves may be changed if it is desired to conduct the heat generating reaction at a different temperature from that which initiated it.

Moreover, where said reaction may be desirably continued at a higher temperature requiring a higher internal pressure of the mercury vapor the sudden and great increase in the total volume of vapor due to the jacket becoming a mercury boiling instead of a mercury condensing device may be taken advantage of to cause control to shift to a pressure relief valve set for a higher pressure and temperature than the one which controls the initial heating. In such case the sudden increase in volume of vapor may exceed the condensing capacity of the first condenser, in which case a valve like 230 set for a below-temperature pressure may be forced open continuously and if the pumping capacity of pump 210 is also exceeded valve 230*a* will become the pressure determining instrumentality.

If the pressure control system of Fig. 1 be employed under conditions above described, the thermostatic valve 16 is likely to be too small to sufficiently relieve the increasing pressure even when wide open, in which case a back pressure will be built up until the pressure relief valve 30 becomes the controlling instrumentality. In such case said valve 30 will be set for the desired exothermic reaction temperature and will come into operation automatically whenever said reaction commences.

Another novel feature in Fig. 4 is the primary heat absorbing element or boiler. This is preferably of iron and comprises a header 201 having a plurality of depending tubes 201*a* forming mercury containing pockets into and out of which mercury may circulate from the header. These tubes are arranged in pairs which are connected across the bottom by conducting element 201*b* removably secured by pins 201*c*, so that each pair of tubes with the header and mercury therein forms a single turn secondary of a transformer of which 201*d* is the core and 201*e* is the primary winding. As indicated in Fig. 6, there are preferably three such pairs of tubes, each energized by a different phase of a three-phase alternating current. An important advantage of this arrangement is that the boiler requires no insulation. Application of the current is through the usual control devices represented by switch 241. Such control devices may be operated to reduce current or open the circuit in response to excessive or sudden increases of pressure or heat either in the mercury system or in the container 205. Such automatic regulation is also contemplated for the other systems described herein.

Within the depending tubes are preferably arranged iron filler pieces 201*f*, which normally float in the mercury. Their cross sections are shaped so as to afford separate paths for upward flow of hot mercury and vapor and down-flow of cool mercury. Various cross sections suitable for this purpose are shown in Fig. 5.

Another novel arrangement for heating the depending tubes of the boiler and the mercury therein is shown in Figs. 8 and 9. Here the primary coils 301*e* encircle the tubes and the iron filler pieces 201*f*, together with the iron of the tubes, header and cross bar, constitute the iron core of the transformer. In this case the heating is entirely by the eddy currents generated in the iron core by the reversals of magnetism thereof in response to the alternating current in said coils 301*e*. In Figs. 8 and 9 the arrangement is for three-phase as in Fig. 6. Fig. 10 shows a variation of the above wherein the primary coil 401*d* encircles the iron connecting bar 201*b* instead of the tubes.

In the system of Fig. 4, it will be noted that if the mercury level were lowered below the bottom of jacket 203 there would be no body of liquid mercury in the jacket and the entire space would be available for mercury vapor heating. A system better adapted for operation with the mercury above or below the bottom of the container or at any desired level is illustrated in Fig. 7.

In this figure, the boiler 501 is upright and extends from below the lowest level of mercury indicated by line 147, 147, to a point well above the higher level indicated by 47′, 47′, the former line being below the bottom of the jacket 503 and the latter above the bottom of container 505. This boiler 501 forms part of a single turn secondary, circuit of which is completed through copper bar 501*x* which is of low enough resistance to practically short circuit the rest of the system. This single secondary is energized by primary coil 501*e* and controlled by switch 541.

The container 505, the jacket 503, the vapor supply tube 502, the gauge 539, the vapor outlet tube 512*a*, the down-flow tube 512 for the condensate, supplemental condenser 524, return pipes 513*a* and 514 may be the same as in Fig. 4. For convenience there is preferably a glass gauge 555 across pipes 502—514 for indicating the level of the mercury in the system. In this system, the pressure controlling valve 530 is located in the pipe 512*a* between the jacket 503 and the condenser 524 and, as diagrammatically indicated, it is adapted to be set for pressures either above or below atmosphere. The exhaust pump is beyond the condenser and consists of a well-known form of barometric jet condenser comprising the upwardly extending suction tube 525 for the vapor, discharging downwardly through the jet 510*a* in chamber 510 supplied with water through opening 510*b* controlled by valve 510*c*. This chamber connects with downwardly extending tube 529 which is long enough to afford a barometric column when water is the fluid. The pipe 529 has an outlet at 550 below the level of the liquid in container 551. This container has two water outlets, one 552 at the proper level to drain off water when the mercury level is at 47, 47, and the other 553, when it is at level 47', 47'. The mercury vapor is condensed by the water and settles out in the container 551. It might be returned to the system through a barometric U-tube like that in Fig. 3, but as shown there is a hand operated valve at 554 which is opened only when the internal pressures are suitable for inflow of mercury without disturbing the adjustment of the apparatus.

In the system of Figs. 4 and 7, where a body of liquid mercury may be and preferably is maintained in contact with the lower portion of the same container which is being heated by condensation of the mercury vapor, there is special advantage in employing a vertically arranged propeller to afford vertical circulation of the mixture, and in Fig. 7 I have shown for this purpose a screw propeller 70 on the lower end of vertical shaft 71 journalled in the cover 507 and power driven through any suitable means, as for instance, a gear 72 driven by gear 73 on horizontal shaft 74 which is supported in a bearing 75 and may be rotated from any desired source of power diagrammatically indicated by belt pulleys 76, 77, one of which may be an idler while the other is keyed to said shaft 74. The vertical circulation thus provided is important not only for mixing but also for driving hot mixture into cooling relation with the liquid mercury for boiling the latter during exothermic reactions and also for displacing the cooler material upward in heating relation with the condensing area of the container when the operation is endothermic.

It will be understood that the presence of liquid mercury in bathing contact with the same container which is heated by condensation of hot vapor supplied from an outside source, is of great importance, not only for controlling the temperature during desired exothermic reactions, but also as an ever present refrigerating medium which will automatically come into operation as a safety appliance in cases where undesired exothermic reactions may occur by accident as in case of certain impurities in certain mixtures or in case of faulty regulation by the pressure controlling devices.

A not uncommon case is where there is a small amount of impurity capable of oxidizing or other exothermic reaction within the range of the desired operating temperature. In such case the cooling action of the boiling mercury will be sufficient to keep down the temperature until the exothermic reaction has been completed, after which the process will proceed as before. In other cases, as where the amount of material for the exothermic reaction is considerable, it may be necessary to have expert attendance and regulation to completely take care of the situation. Even in cases where the danger never materializes, the advantage of the liquid mercury as a precautionary safety device is obvious.

It will be understood as to all of the systems shown herein that adjustment of heating current may be such as to boil mercury at rates sufficient to supply more vapor than will be condensed in the heating coil or jacket. Such excess represents waste but unless maintained the system controls will operate only as upper limit regulators. If, however, the vapor is always in excess, the working temperature will be kept up to the predetermined limit as well as prevented from falling below it.

While the various systems disclosed herein are capable of being operated either above or below atmosphere, as heretofore explained, there are great advantages in employing them for the operations which can be performed at or below atmospheric pressure, that is, for temperatures at or below 357° centigrade, the atmospheric boiling point of mercury. Hence, as will be evident, a great variety of heating operations, particularly for chemical reactions can be accomplished with the secondary valve, as for instance, valve 30, Fig. 1, set to open at or below atmosphere. In the below-atmosphere operation there can be no leaks of mercury to the exterior. Any leaks must be inward into the system and any impurities thus introduced are drawn off with the excess uncondensed vapor and are gradually worked out of the system by continued operation of the vacuumizing pump. While the leaks are thus in the direction of safety as regards human life and are taken care of as above described, it is to be understood that they are highly undesirable and the greatest possible care is taken to prevent them.

In my prior Patent No. 1,619,661 I have stated that mercury vapor may be obtained at 430° Fahrenheit under a pressure of only nine-tenths pounds to the square inch. Higher degrees of heat may be obtained with corresponding increase in pressure. And I have also described how these pressures, required for desired temperatures, can be maintained by a vacuum pump operated and controlled in the usual manner in connection with an ordinary pressure gauge which indicates the boiler pressure. While the methods claimed in said application can be practised by manual control of the pump in connection with the gauge, there are important advantages in employing automatic means for the purpose. Hence my present application concerns certain varieties of automatic means which may be used for controlling internal pressures. Also said automatic means include devices that are capable of operation at pressures above as well as below atmosphere. Specifically considered, the principal regulating means are in the nature of relief valves and, to take care of the specific case where the internal pressures are below-atmosphere, there are the various forms of vacuumizing pumps. Such pumps require no special description or illustration, being well-known in the art, and they may be continuously operated for predetermined low vacuum without special regulation. It will be noted, however, that in ordinary operation they are not required to maintain vacuum any greater than is necessary to give internal pressures free vent when the relief valve is open. Hence said vacuum pumps may be supplied with automatic control mechanism to maintain only the required degree of vacuum; and when the valves are set for above-atmosphere pressures, the pumps may be cut off either by hand valves as indicated in Figs. 3 and 4, or by any desired automatic mechanism.

It will be understood that the pressure relief valves, such as 30, 130, 130*a*, 230, 230*a*, and 530, are diagrammatically indicated as having the internal pressure on the valve element directly opposed by external atmospheric pressure which latter is adjustably counterbalanced or augmented by the weighted lever. It will be understood, of course, however, that various other valve-operating means may be utilized with a view to more accurate regulation.

In systems of the type herein described, transfer of a given amount of heat requires boiling and condensing of relatively large amounts of mercury. Hence the velocity of the vapor flow is great and the resulting friction may give rise to a certain amount of back pressure. Hence it will be understood as to all of the systems the mercury level in the boiler may be somewhat below that in the pipes leading from the condensers and it will sometimes be necessary to make allowance for this.

In this same connection it may be noted that the level of the condensed mercury may be raised to a desired higher level than the mercury in the boiler by throttling of the return flow of the condensed vapor. For instance, in Fig. 7 the mercury may be raised to or above the level 47′—47′ in the condensing jacket while the mercury in the boiler is at a much lower level by suitably adjusting a valve like 230 which can be inserted in pipe 512. The back pressure could be varied by partially closing a similar valve, which can be arranged in pipe 502. Preferably, however, the back pressure should be kept as small as possible so that the pressure throughout the entire system may be more nearly uniform.

I claim:

1. The method of transferring heat which consists in imparting heat to mercury to boil off mercury vapor in one region of a circulating system, absorbing heat from the mercury vapor at another region of the system to condense it; and governing the temperature in the region to which the heat is transferred by governing the pressure of the condensing vapor by and in accordance with the temperature of the latter region.

2. The method of transferring heat which consists in imparting heat to mercury to boil off mercury vapor in one region of a circulating system, absorbing heat from the mercury vapor at another region of the system to condense it; and governing the temperature of condensation by boiling off amounts of mercury vapor in excess of the condensing capacity of the region of condensation and maintaining a desired pressure in the circulating system by venting the necessary amounts of said vapor.

3. The method specified by claim 2, and wherein the desired internal pressure is below atmosphere and a partial vacuum is maintained in the region to which the pressure is vented.

4. The method specified by claim 2, regulating the boiling of the mercury to produce a desired minimum excess of heat transferring vapor, by applying electric current of low voltage and large amperage to generate heat in the mercury, and controlling the current to vary the amount of heat produced thereby.

5. A method of heat treatment of compounds yielding desired constituents when heated above the atmospheric boiling point of mercury, which method includes imparting heat to liquid mercury to boil off mercury vapor in one region of a circulating system and causing condensation by absorbing heat from said vapor in another region of the system which is in heat exchange relation with said compounds; the mercury boiled off being in excess of the total condensation in the system, thereby establishing super-atmospheric internal pressures, while preventing rise of pressure above that required for the desired volatilizing of constituents of the compound by relieving pressure and condensing surplus vapor in a third region, by and in accordance with the temperature of one of said first mentioned regions of the circulating system.

CROSBY FIELD.